(No Model.)  2 Sheets—Sheet 1.
L. D. BULLOCK.
MACHINE FOR JOINTING FELLIES.
No. 286,586. Patented Oct. 16, 1883.
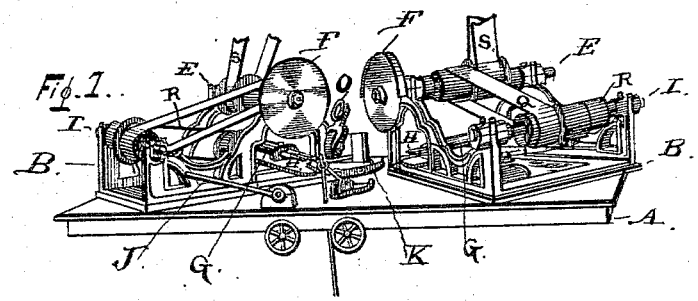
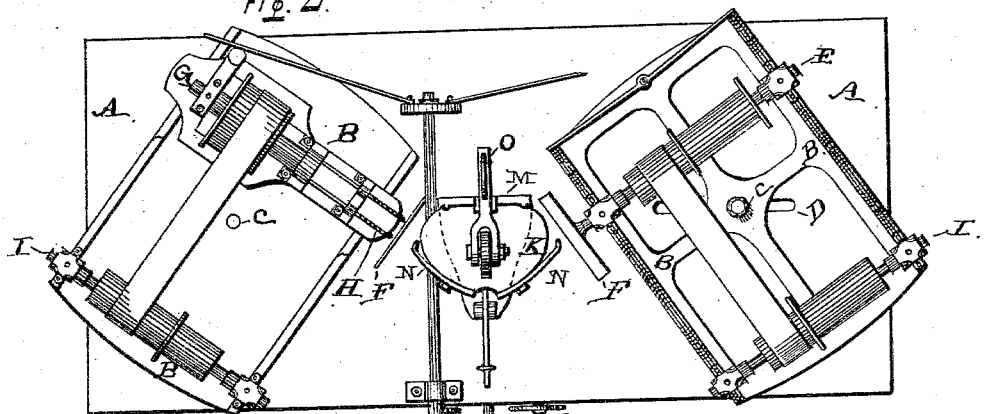
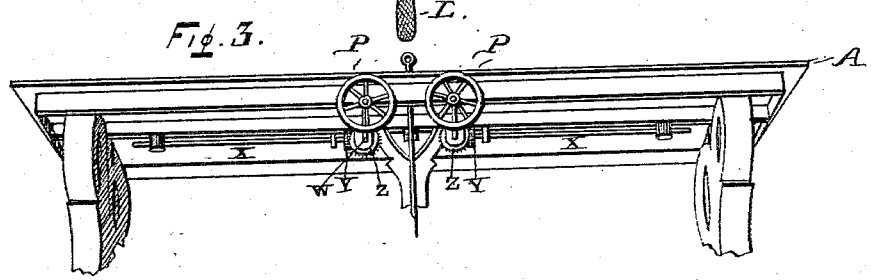
Witnesses:
George B. Shaw
Geo. O. W. Farnham
Inventor:
Lovell D. Bullock
per Charles E. Allen
Atty.

(No Model.) 2 Sheets—Sheet 2.
L. D. BULLOCK.
MACHINE FOR JOINTING FELLIES.
No. 286,586. Patented Oct. 16, 1883.
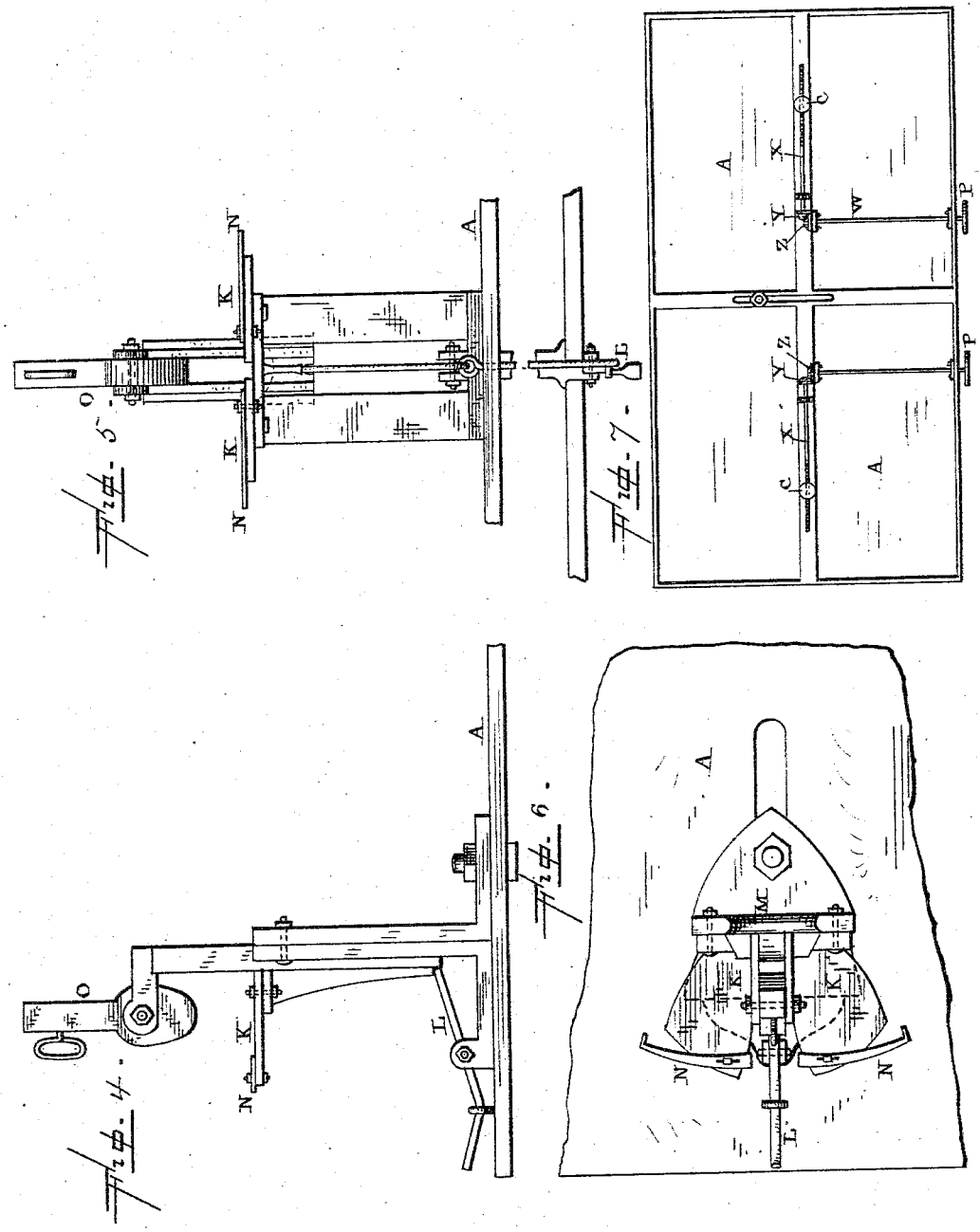

UNITED STATES PATENT OFFICE.

LOVELL D. BULLOCK, OF JERICHO, VERMONT, ASSIGNOR OF ONE-HALF TO JOHN GERRARD, OF SAME PLACE.

MACHINE FOR JOINTING FELLIES.

SPECIFICATION forming part of Letters Patent No. 286,586, dated October 16, 1883.

Application filed June 25, 1883. (No model.)

*To all whom it may concern:*

Be it known that I, LOVELL D. BULLOCK, a citizen of the United States, residing at Jericho, in the county of Chittenden and State of Vermont, have invented certain new and useful Improvements in Felly-Joint-Fitting Machines, of which the following is a specification, reference being had therein to the accompanying drawings.

My invention relates to an improvement in adjustable felly-joint-fitting machines; and it consists, first, in the combination of a suitable table, two adjustable yokes which carry both the saws and the boring-bits, and which yokes are horizontally adjustable upon the table in relation to the clamp by means of which the felly is held; second, in the combination of a suitable table, two yokes which are horizontally adjustable, a suitable clamping mechanism for adjusting the yokes back and forth, and a mechanism for moving the shafts which carry the boring-bits forward, so as to bring the bits in contact with the ends of the felly which has just been operated upon by the saws.

The object of my invention is to produce a machine in which the saws are laterally adjustable, according to the length of felly which is to be cut, and in which the shafts which carry the boring-bits are placed in a vertical line with the saw-arbors, so that after the ends of the felly have been cut the felly may be moved into position to be operated by the bits.

Figure 1 is a perspective of a machine embodying my invention, taken from the front. Fig. 2 is a plan view of the machine, a portion of one of the yokes being removed, so as to show the shaft which carries the bit. Fig. 3 is a perspective of the under side of the table. Figs. 4, 5, and 6 are detail views of the clamp. Fig. 7 is an inverted view of the table.

A represents the supporting-table for the two yokes and the clamp upon which the felly is held. The yokes B consist of the frames in which the saws and the operating-bits are journaled, and which yokes are horizontally adjustable upon the table in relation to the clamp by which the felly is held. Through the top of the table, under each yoke, is made a slot, D, through which passes a clamping-bolt, C. Upon the upper end of these clamping-bolts are placed the nuts, by means of which the yokes can be rigidly locked in place after they have been once adjusted in position. The bolts C pass down through the table and have the rods X passed through them. These rods extend toward the center of the table, and have secured upon their inner ends suitable beveled wheels, Y, which engage with other bevel-wheels, Z, which are secured to the inner ends of the shafts W, which extend horizontally under the table from the front side. On the outer ends of these shafts W are secured the hand-wheels P, by means of which the yokes can be adjusted back and forth upon the top of the table independently of each other. When the hand-wheels P are turned in one direction these yokes are drawn nearer to the clamp, which is placed upon the center of the table, and when the wheels are turned in the opposite direction the yokes are moved outward away from the clamp.

Journaled upon the top of each one of the yokes is the shaft or arbor E, which has the saw F secured to its inner end. These saws are adjusted at any desired angle to the clamp, so as to give the necessary angle to the end of the felly which is being operated upon, by turning the yoke upon the bolt C. This shaft E is driven by the belt S from the counter-shaft overhead, and extending from this shaft E on the shaft Y is a belt, Q. This belt imparts a rotary motion to the shaft I, and from this shaft I extends a second belt, R, for driving the shaft G, to which the boring-bits are secured. The bit-shaft G and the saw-shaft E are placed directly over each other, and at the same angle in the yoke B. The shaft E has no other than a rotary movement, while the shaft G has an endwise movement by means of the lever J, for the purpose of bringing the bits in contact with the ends of the felly, which has just been cut off by the saws F.

Loosely placed on the center of the table is the vertical adjustable table or support K, to which the clamps are secured, and which is made vertically adjustable by the foot-lever L. Secured on the rear edge of the table is the clamp M, and secured to the front edge are the two adjustable clamps N. The felly is clamped down upon the table K by means of the eccentric disk or cam, which is journaled in suitable bearings. After the felly has been placed upon the table and secured in position, the yokes B are adjusted in the desired relation to the ends of the felly, and then the felly is raised upward toward the saw by means of pressure upon the foot-lever L. This pressure of the lever L causes the table to rise vertically and bring the ends of the felly against the under edges of the saws. As soon as the ends of the felly have been cut off the pressure is removed from the lever L, when the table K drops downward. This brings the ends of the felly directly opposite the bits H. When the lever J is moved the shafts G are moved forward sufficiently far to bore the dowel-pins. After the holes have been bored the clamps are released and the felly removed. In order to allow the bits H an endwise movement, the shafts I and G are provided with long pulleys, so that the endwise movement of the shafts will not affect the running of the belts.

Having thus described my invention, I claim—

1. The combination of a slotted table, the horizontally-adjustable yokes carrying both saws and bits, and a vertically-moving clamp, to which the felly to be operated upon is secured, substantially as shown.

2. In a felly-machine, the combination of the slotted table, the yokes which are adjustable thereon, and the clamping-bolts by means of which the yokes are secured in position upon the table, the shafts W X, which extend at right angles to each other on the under side of the table, and the operating-wheels P Y Z, which are secured to the ends of the shafts, whereby the yokes are adjusted in connection with the cams, substantially as described.

3. The combination of the slotted table A, the adjustable yokes, and a mechanism for adjusting each one independently, a vertically-moving table provided with clamps, and the saw and bit shafts and their operating mechanism, the shafts being placed vertically above each other, substantially as set forth.

In testimony whereof I do affix my signature in presence of two witnesses.

LOVELL D. BULLOCK.

Witnesses:
 CHARLES E. ALLEN,
 L. F. WILBUR.